April 28, 1936.    H. LINDNER    2,039,232
RECTILINEAR ADJUSTMENT OF MACHINE PARTS
Filed Feb. 8, 1935

Inventor:
Herbert Lindner
By Thuchs. Appleman
atty.

Patented Apr. 28, 1936

2,039,232

UNITED STATES PATENT OFFICE 2,039,232

RECTILINEAR ADJUSTMENT OF MACHINE PARTS

Herbert Lindner, Berlin, Germany

Application February 8, 1935, Serial No. 5,683
In Germany May 9, 1934

8 Claims. (Cl. 33—181)

This invention relates to the rectilinear adjustment of parts of a machine relative to one another and more particularly to the adjustment of the work carriage of a machine tool such as a jig boring machine relative to the frame, the invention having for its object to provide an improved method of mechanism for effecting such adjustment whereby a high degree of accuracy and reliability is ensured.

In machine tools the movement of the work carriage to the required position of adjustment is usually effected by means of a screw-threaded spindle, the coarse adjustment being indicated on a rectilinear scale arranged parallel to the direction of movement of the carriage while the fine adjustment is indicated on a cylindrical graduated scale mounted on the spindle which is provided with a vernier enabling the displacement to be read to 1/1000 mm. Correcting devices are often also provided which affect the vernier and practically overcome the cumulative inaccuracies of the adjustable screw-threaded spindle. After a considerable period of use however these correcting devices no longer operate reliably owing to wear of the thread of the spindle. The screw-threaded spindle is furthermore subject to torsion stresses and strains due to the weight of the carriage which is often considerable, and as these strains lie between limits of a few hundredths to thousandths of a millimeter, they render impossible an exact adjustment of the carriage to a few thousandths of a millimeter, as is now required.

The invention constitutes a departure from these arrangements hitherto utilized, and according to the invention a sliding member which is independent of the carriage is arranged to be adjusted parallel to its guides by means of known measuring and adjusting devices to the desired distance. The carriage is then displaced until an indication mark on the carriage registers with a mark on the sliding member. Preferably the setting of the mark on the carriage to the mark on the sliding member is arranged to be effected by an optical device. It will be evident that the adjusting mechanism for the sliding member has only to move the weight of this member, which is extremely small, and is thus relieved from all mechanical stresses. The adjustment of the sliding member to the desired measured distance can therefore be effected by the cooperation of the optical device with the greatest possible accuracy, and the adjusting mechanism for the carriage no longer determines the accuracy of the adjustment but is only employed for displacing the carriage.

The invention is illustrated by way of example in the accompanying drawing of which Figure 1 is a cross sectional view of one form of adjusting mechanism embodying the invention, Figure 2 being a plan view thereof.

Figure 1:
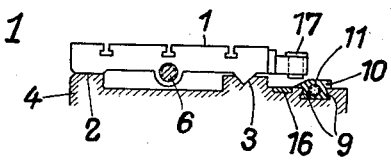
Figure 2:
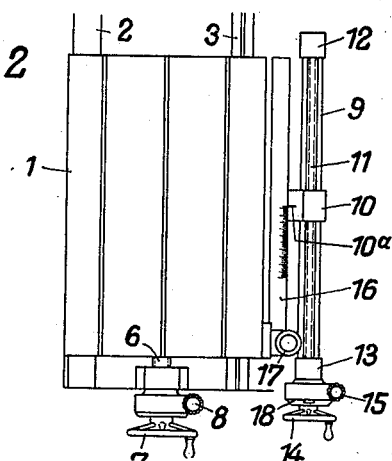
Figure 4:
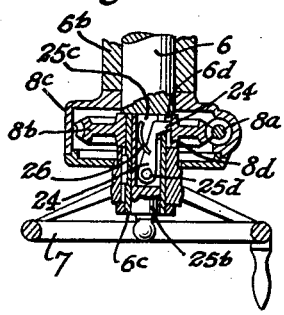
Figure 4 is a detail section showing the coarse and fine feed arrangement for the carriage of the machine with which the invention is associated.
Figure 5:
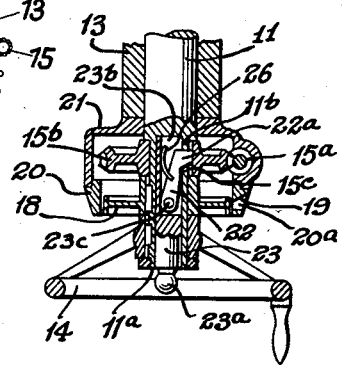
Figure 5 is a similar view of the means for adjusting the slider used herewith.
Figure 6:
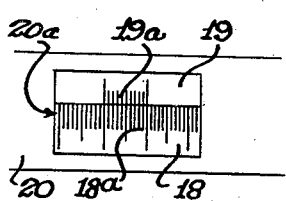
Figure 6 is a detail view of the micrometer vernier used in the invention.

Referring now to the drawing it will be seen that the machine part to be moved through exact distance is shown as the work carriage 1 of a machine tool, and is rectilinearly adjustable in guides 2, 3 on the stationary bed 4 of the machine tool. A screw-threaded spindle 6 is shown as the adjusting element which is adjustable by means of a hand wheel 7 or a hand wheel 8, the hand wheel 8 cooperating with a worm gear acting on the spindle 6 and serving for the fine adjustment of the carriage 1. In order to provide for the coarse and fine feed of the carriage, the spindle or feed screw 6 is provided with a journal 6a supported in a bearing 6b. To the bearing is fixed a casing 8c and the feed screw has a tubular reduced end 6c. Journalled in the casing 8c is a worm 8a on which the hand wheel 8 is fixed. On the reduced end 6c within the casing is a worm gear 8b which is engaged by the worm 8a and may be connected to or disconnected from the feed screw 6a. In order to provide for this, the worm gear 8b is provided with a keyway 8d and the end 6c has a slot 6d which may move into and out of registry with the keyway 8d. Mounted in the hollow end 6c is a plunger 25 provided on its outer end with an operating knob or handle 25b by means of which the plunger may be moved inwardly and outwardly of the hollow end 6c. The plunger 25 is provided with a slot 25c across which extends a pivot pin 25d. On the pin 25d is mounted one end of an arm 24 which has its free end provided with a nose 24a movable into and out of engagement in the keyway 8d through the slot 6d. This nose is urged outwardly by the spring 26 and is beveled so that pulling the plunger outwardly causes the arm 24 to swing against the action of the spring and thus to release the nose 24a from the keyway 8d. Thus, when the plunger is in its outer position, the hand wheel 7 is used to rotate the screw 6a, but when the plunger is pushed in, such rotation is effected by the hand wheel 8. Parallel to the guides 2, 3 is arranged a guide-way 9 for a slider 10 which is provided with an internally screw-threaded nut with which a screw-threaded spindle 11 engages, the spindle 11 being mounted in bearings 12, 13 on the bed of the machine, so as to be capable of rotary movement without axial displacement. In order to adjust the slider 10 in the guide-way 9 a hand wheel 14 is provided, and for the fine adjustment a hand wheel 15 is provided, which cooperates with a worm gear. The details by which the fast and slow movements of the slider are effected and the arrangement of the vernier scale are shown in Figures 5 and 6. It will be seen from these figures that a casing 21 is fixed on the bearing 13 and that the spindle or feed screw 11 has a tubular extension 11a which projects through the casing and has the hand wheel 14 keyed on it at its open end. Journalled in the casing 21 is a worm 15a on which is fixed the hand wheel 15 and this worm meshes with a worm gear 15b mounted on the end 11a. This worm wheel may be coupled to and uncoupled from the end 11a and to effect this, the end 11a is provided with a slot 11b and the worm wheel is provided with a keyway 15c, the slot and keyway being movable into and out of registry. A plunger 23 is slidably mounted in the end 11a and is provided with an operating knob or handle 23a by means of which the plunger may be moved inwardly and outwardly of the end 11a. In this plunger is a slot 23b across which extends a pivot pin on which is mounted one end of an arm 22. The arm 22 is provided with a nose 22a arranged to move through the slot 11b into and out of the keyway 15c. A spring 27 urges the nose outwardly. This device is thus like that for the feed screw 6 and operates in the same manner. The casing 21 has mounted thereon a ring 20 having a window opening 20a at a convenient point for observation, and this window opening has a beveled side 19 whereon are formed vernier graduations 19a. Keyed on the end 11a is a wheel 18 which fits within the ring 20 so that a portion of its periphery is exposed through the window opening 20a. The peripheral surface of this wheel is provided with scale graduations 18a positioned to cooperate with the vernier graduations 19a as best seen in Figure 6. An indication mark 10a is diagrammatically shown on the slider 10 and moves along the scale 16. An optical reading device is diagrammatically indicated at 17 as mounted on the carriage 1, and is provided with a double reading mark 16a.

Figure 3:
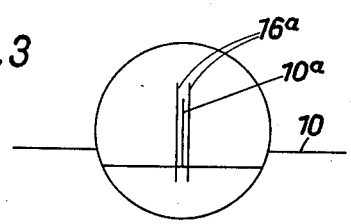
Figure 3 is a view showing the optical field of the device.

In adjusting the carriage 1 to an exact displacement distance from its original position the operation is as follows:

The slider 10 is first so adjusted that its indication mark 10a lies in the double reading mark 16a of the optical device 17 (see Fig. 3). The slider is then moved by rotating the spindle 11 to the exact distance required, the coarse adjustment being effected on the scale 16, while the fine adjustment is effected on the cylindrical scale and vernier 18 carried by the spindle 11. This cylindrical scale permits of reading hundredths of a millimeter and by means of the vernier thousandths of a millimeter can be read. The carriage 1 is then moved forward by means of the spindle 6 until the marks 16a of the optical device 17 straddle with the mark 10a on the slider 10 (see Fig. 3). The carriage 1 is in this manner adjusted very exactly to the desired distance, the accuracy of the spindle 6 being quite negligible and any adjusting means other than the spindle mechanism illustrated may be employed. The spindle 11, however, for the adjustment of the slider 10 is of a very high accuracy, being hardened and polished as much as possible, and if necessary provided with correcting devices. Since this spindle is only required to move the relatively light weight of the slider 10, its wear is practically negligible. The slider 10 is preferably constructed in a known manner as a spring nut, in order to reduce the play at the screw threads as much as possible. The optical device can also if desired be mounted on the slider 10 in which case the carriage 1 will be provided with an indication mark which can be made to coincide with the double mark on the optical device carried by the slider.

I claim:—

1. In measuring apparatus for machine tools, a lineally movable carriage, a stationary structure including a support along which said carriage is movable, means to move the carriage along the support, a feed screw independent of the carriage and journalled to extend along the carriage with its axis parallel to the direction of movement of said carriage, a scale fixed to said stationary structure in parallel relation to the feed screw, a sliding member mounted on the screw to travel along the screw as the latter is rotated, an index on the sliding member traversing said scale, an index on the carriage movable with the carriage into coincidence with the first index, and means to rotate said feed screw.

2. In measuring apparatus for machine tools, a lineally movable carriage, a stationary structure including a support along which said carriage is movable, means to move the carriage along the support, a feed screw independent of the carriage and journalled to extend along the carriage with its axis parallel to the direction of movement of said carriage, a scale fixed to said stationary structure in parallel relation to the feed screw, a sliding member mounted on the screw to travel along the screw as the latter is rotated, an index on the sliding member traversing said scale, an index on the carriage movable with the carriage into coincidence with the first index, an optical device associated with one of said indexes for observing its coincidence with the other index, and means to rotate said feed screw.

3. In measuring apparatus for machine tools, a lineally movable carriage, a stationary structure including a support along which said carriage is movable, means to move the carriage along the support, a feed screw independent of the carriage and journalled to extend along the carriage with its axis parallel to the direction of movement of said carriage, a scale fixed to said stationary structure in parallel relation to the feed screw, a sliding member mounted on the screw to travel along the screw as the latter is rotated, an index on the sliding member traversing said scale, an index on the carriage movable with the carriage into coincidence with the first index, and means to rotate said feed screw including a fast motion device and a slow motion device.

4. In measuring apparatus for machine tools, a lineally movable carriage, a stationary structure including a support along which said carriage is movable, means to move the carriage along the support, a feed screw independent of the carriage and journalled to extend along the carriage with its axis parallel to the direction of movement of said carriage, a scale fixed to said stationary structure in parallel relation to the feed screw, a sliding member mounted on the screw to travel along the screw as the latter is rotated, an index on the sliding member traversing said scale, an index on the carriage movable with the carriage into coincidence with the first index, an optical device associated with one of said indexes for observing its coincidence with the other index, and means to rotate said feed screw including a fast motion device and a slow motion device.

5. In measuring apparatus for machine tools, a lineally movable carriage, a stationary structure including a support along which said carriage is movable, means to move the carriage along the support, a feed screw independent of the carriage and journalled to extend along the carriage with its axis parallel to the direction of movement of said carriage, a scale fixed to said stationary structure in parallel relation to the feed screw, a sliding member mounted on the screw to travel along the screw as the latter is rotated, an index on the sliding member traversing said scale, an index on the carriage movable with the carriage into coincidence with the first index, means to rotate said feed screw, and a micrometric vernier associated with the last means for measuring fractional rotations of the feed screw.

6. In measuring apparatus for machine tools, a lineally movable carriage, a stationary structure including a support along which said carriage is movable, means to move the carriage along the support, a feed screw independent of the carriage and journalled to extend along the carriage with its axis parallel to the direction of movement of said carriage, a scale fixed to said stationary structure in parallel relation to the feed screw, a sliding member mounted on the screw to travel along the screw as the latter is rotated, an index on the sliding member traversing said scale, an index on the carriage movable with the carriage into coincidence with the first index, an optical device associated with one of said indexes for observing its coincidence with the other index, means to rotate said feed screw, and a micrometric vernier associated with the last means for measuring fractional rotations of the feed screw.

7. In measuring apparatus for machine tools, a lineally movable carriage, a stationary structure including a support along which said carriage is movable, means to move the carriage along the support, a feed screw independent of the carriage and journalled to extend along the carriage with its axis parallel to the direction of movement of said carriage, a scale fixed to said stationary structure in parallel relation to the feed screw, a sliding member mounted on the screw to travel along the screw as the latter is rotated, an index on the sliding member traversing said scale, an index on the carriage movable with the carriage into coincidence with the first index, means to rotate said feed screw including a fast motion device and a slow motion device, and a micrometric vernier associated with the last means for measuring fractional rotations of the feed screw.

8. In measuring apparatus for machine tools, a lineally movable carriage, a stationary structure including a support along which said carriage is movable, means to move the carriage along the support, a feed screw independent of the carriage and journalled to extend along the carriage with its axis parallel to the direction of movement of said carriage, a scale fixed to said stationary structure in parallel relation to the feed screw, a sliding member mounted on the screw to travel along the screw as the latter is rotated, an index on the sliding member traversing said scale, an index on the carriage movable with the carriage into coincidence with the first index, an optical device associated with one of said indexes for observing its coincidence with the other index, means to rotate said feed screw including a fast motion device and a slow motion device, and a micrometric vernier associated with the last means for measuring fractional rotations of the feed screw.

HERBERT LINDNER.